United States Patent [19]
Chapsal

[11] 3,823,923

[45] July 16, 1974

[54] DEVICE AND APPARATUS FOR TREATING LIQUIDS SUCH AS DRINKING WATER AND WASTE WATER

[75] Inventor: Paul Chapsal, Colombes, France

[73] Assignee: Trailigaz-Societe Industrielle du Traitement des Liquides et des Gaz, La Courneuve, France

[22] Filed: Jan. 11, 1972

[21] Appl. No.: 216,951

[30] Foreign Application Priority Data
Mar. 16, 1971  France ............................ 71.09193

[52] U.S. Cl. ............................ 261/93, 261/DIG. 42
[51] Int. Cl. ............................................. B01d 47/18
[58] Field of Search ...................... 261/93, DIG. 42

[56] References Cited
UNITED STATES PATENTS
| | | | |
|---|---|---|---|
| 1,242,445 | 10/1917 | Ittner | 261/93 X |
| 2,448,590 | 9/1948 | Gunther | 261/93 X |
| 2,515,538 | 7/1950 | Wall | 261/93 X |
| 2,615,698 | 10/1952 | Valentine | 261/93 |
| 2,743,914 | 5/1956 | Epprecht | 261/93 X |
| 2,966,266 | 12/1960 | Coke | 261/93 X |
| 3,490,996 | 1/1970 | Kelly, Jr. | 261/93 X |

*Primary Examiner*—Frank W. Lutter
*Assistant Examiner*—William Cuchlinksi, Jr.
*Attorney, Agent, or Firm*—Young & Thompson

[57] ABSTRACT

Device for treating a liquid and in particular drinking water or waste waters. The device comprises a tube which is immersed in the liquid in a tank and communicates at its upper end with treating gas-supply means. A diffuser having radial vanes fixed to a rotating disc communicates with the lower end of the tube. A pump disposed under and coaxial with the diffuser pumps the liquid from the tank through passages in the disc into chambers defined by the vanes so as to form in the chambers an emulsion of the gas and liquid which is thereafter ejected into the liquid in the tank.

10 Claims, 4 Drawing Figures

DEVICE AND APPARATUS FOR TREATING LIQUIDS SUCH AS DRINKING WATER AND WASTE WATER

The present invention relates to devices and apparatuses for treating liquids, and in particular drinking water or waste waters, by means of a gaseous fluid such as air containing ozone.

Such apparatuses are known in which the ozonecontaining air, or the air containing some other treating gas, is introduced in the liquid contained in a tank by means of a device comprising a vertical tube extending vertically from the upper surface of the liquid, a fan disposed in the upper part of the tube injecting therein air under pressure, and a rotary diffuser or distributor disposed coaxially with the tube in the lower part of the latter and rotated by a motor. In this simple form, such devices however do not give satisfaction, particularly when the rate of flow of the liquid to be treated and consequently the rate of flow of the ozonized air which must be injected become relatively high and the depth of immersion of the distributor exceeds a given value. Indeed, it has been found that, irrespective of the power of the fan and irrespective of the speed of rotation and the size of the radial vanes which constitute the distributing element, although sufficient amounts of ozonized air can be injected in the liquid, the distribution or dispersion of this air is not effected under satisfactory conditions since this air is in particular injected in the form of large-size bubbles. Now, it is absolutely essential that the size of the gas bubbles to be diffused in the liquid be very small so as to achieve a very large specific contact surface and high efficiency in the utilization of the ozone.

An object of the invention is to provide such a device comprising a tube immersed in the liquid, means for injecting in the upper part of the tube treating gas under pressure, and means for diffusing the ozonized air comprising a rotary distributor mounted coaxially with the tube in the lower part of the tube, whereby it is possible to achieve within a flow range and a very high water pressure head a satisfactory diffusion and consequently maximum efficiency of utilization of the ozone.

The invention provides a device comprising means defining a pump disposed immediately below the distributing means or diffuser, and passages putting the pump and the chambers defined between the vanes of the distributing means in communication so as to form in the chambers an emulsion of the liquid to be treated and the treating gas, said emulsion being thereafter ejected outwardly of the rotary distributing means.

In a preferred embodiment, the pump comprises a fixed body and a number of vanes mounted on the same shaft that drives the rotary distributing means.

By means of such an arrangement, and in particular owing to the fact that there is achieved prior to the ejection of the gas into the liquid an emulsion of the gas and liquid, the desired result is obtained, that is to say, the bubbles of gas which are dispersed in the liquid have a very small size, and in any case less than 5 mm and mostly less than 2 mm, so that at a depth a water of, for example, 3 metres and under conditions which will be defined hereinafter there is achieved an efficiency of utilization of the ozone of the order of 100 percent.

Further features and advantages of the invention will be apparent from the ensuing description with reference to the accompanying drawings.

Figure 1:
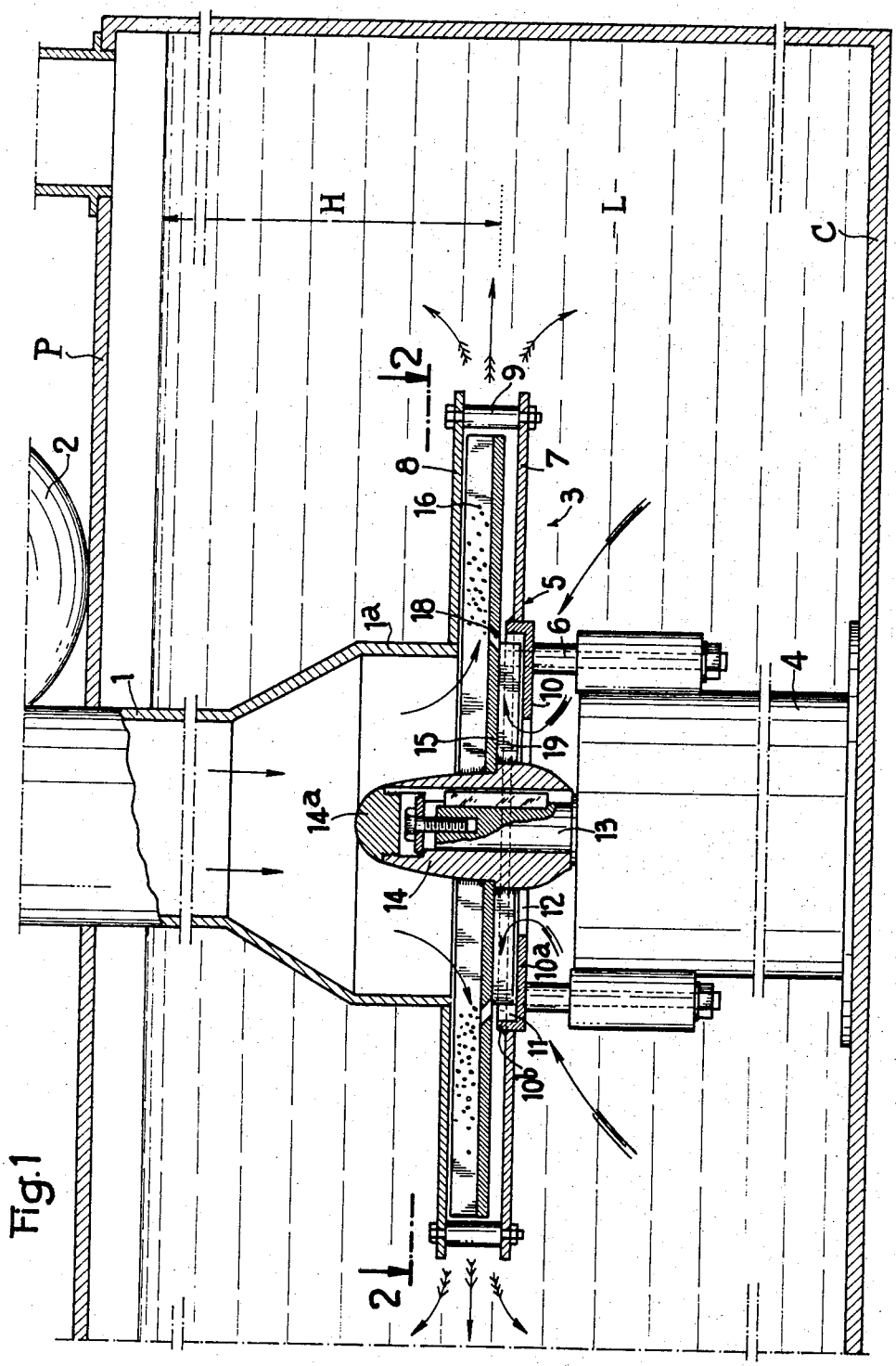
FIG. 1 is a vertical diagrammatic sectional view of a device according to the invention.

Such a device, which can be employed in particular for diffusing ozonized air in waste waters, is placed in a tank C which contains the liquid L to be treated and is closed in its upper part by a wall P.

The device comprises means supplying ozonized air under pressure constituted by a vertical tube 1 immersed in the liquid, a fan 2 disposed in the upper part of the tank and having its discharge conduit connected to the vertical tube, and diffusing or distributing means 3 disposed in the lower part of the vertical tube and driven by an electric motor 4 which can be a fluidtight motor, a motor having an immersed rotor, or any other motor capable of being immersed.

The distributing part of this device will now be described in more detail. The distributor comprises a case 5 which is fixed to the frame of the motor by spacer members 6 and has two parallel and circular side walls, namely a lower wall 7 and an upper wall 8. The two walls are interconnected at their periphery by spacer members 9. The upper wall 8 is apertured in its centre part so as to connect it to the enlarged lower end portion 1a of the vertical ozonized air supply tube 1.

The lower wall 7 is also apertured in its centre part and receives along its inner peripheral edge an annular body 10 having a bottom wall 10a parallel to the side walls 7 and 8 and an outer flange portion 10b which defines a chamber 11. The body 10 has in its centre part an aperture 12 whose function will be explained hereinafter. According to a modification, the body 10 may be an integral part of the wall 7.

Figure 2:
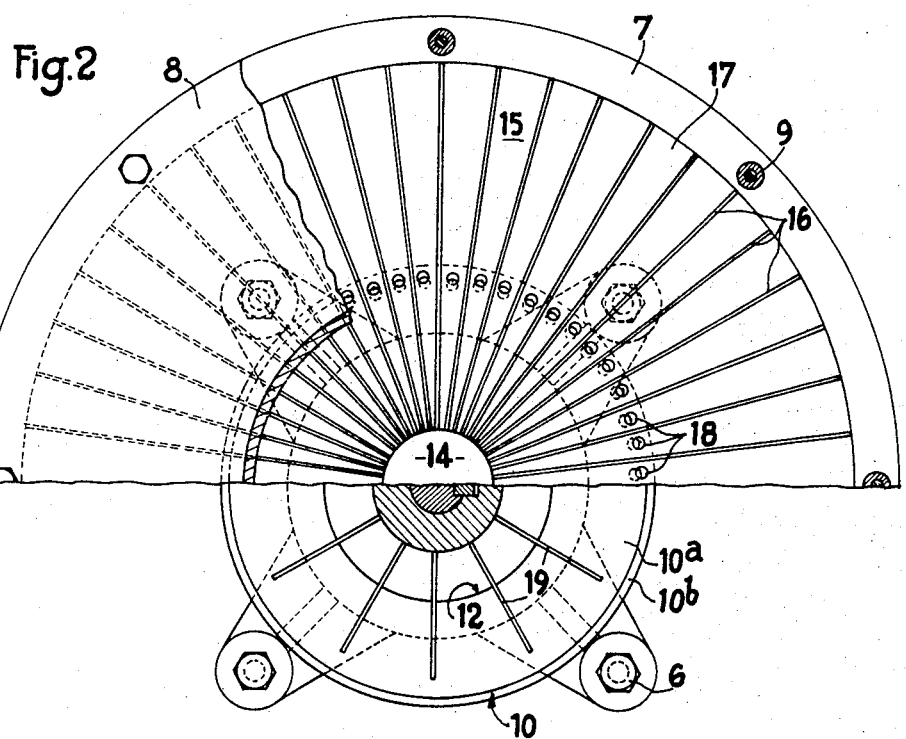
FIG. 2 is a partial sectional view, with parts cut away, taken on line 2—2 of FIG. 1, and FIGS. 3 and 4 are two diagrams showing apparatuses in which a device according to the invention can be incorporated.

A shaft 13 extends axially from the upper part of the motor 4 through the apertures formed in the body 10 and upper wall 8. Keyed to the shaft 3 is a hub 14 which is closed by a shaped cap 14a, and a disc 15 carrying on its upper face a number of radial vanes 16 which extend vertically practically through the entire free space between the disc 15 and the upper wall 8 and radially roughly throughout the distance between the centre hub 14 and the outer spacer members 9, this distance being substantially greater than the radius of the tube 1. In the presently described embodiment, 48 vanes are provided. This number is high relative to the number of vanes provided in conventional devices. The vanes 16 define therebetween and with the upper wall 8 and the disc 15 as many chambers 17 (FIG. 2) each of which communicates with the space under the disc 15 by way of orifices 18 formed in the disc 15 and extending obliquely with respect to the vertical. These orifices open into the chamber 11 in the vicinity of the flange 10b. The disc 15 carries on its lower face twelve vanes 19 in the presently described embodiment which extend radially from the centre hub 14 to the vicinity of the orifices 18 and vertically roughly throughout the distance between the bottom of the body 10 and the disc 15.

The device just described operates in the following manner:

When the fan 2 placed in the upper part of the tube 1 drives into this tube ozonized air at a pressure sufficient to overcome the pressure corresponding to the head H of the column of water above the distributor and the shaft 13 is rotated by the immersed motor, the vanes 19 disposed in the lower part of the disc 15 draw water through the annular aperture 12 defined between the hub and the inner peripheral edge of the body 10 and discharge this water by way of the oblique orifices 18 in the direction of the chambers 17 between the vanes 16 of the distributor rotor. Consequently, this part of the device operates in the manner of a pump whereas the chamber 17 defined between the vanes 16 of the rotor perform the function of a mixing chambers in which is formed an emulsion of the liquid supplied by the pump and the ozonized air supplied to these chambers by way of the tube 1. Owing to the previous formation of this emulsion, the ozonized air is thereafter ejected out of the distributor in the form of very fine bubbles whose sizes are of the order of 1 to 2 mm, these bubbles being moreover ejected a relatively great radial distance bearing in mind the magnitude of the ozonized air flow introduced in the device and the peripheral speed of the vanes of the distributor.

To achieve good performance, it is important that a number of conditions be satisfied:

the number of vanes 16 must be sufficiently high so that the volume of each of the chambers 17 defined by adjacent pairs of vanes is not too great;

these vanes must be relatively short in height so that the streams of liquid coming from the orifices 18 be perfectly distributed in these chambers and that the pump means does not have to overcome an excessively high pressure;

it is also important that the amount of liquid supplied by these orifices 18 represent a roughly determined percentage of the ozonized air flow introduced; for example, if the device operates with a head of water H of the order of 3 m and if the ozonized air flow to be injected in this water is of the order of 450 m³ per hour (which corresponds to about 10 m³ per vane), the flow of liquid supplied by the pump must be of the order of 4 – 4.5 m³ of water per hour, that is, of the order of 1 percent of the total flow of gas.

The fan 2 located in the upper part of the tube is adapted to supply gas under a pressure in the neighbourhood of that corresponding to the head H of the column of water, or slightly less than this head, so that when the device operates, the distributing means absorbs practically no power. Only the part forming a pump absorbs power and it should be noted that this power is very low.

As concerns the other constructional features of the device and in particular the diameter of the vanes 16 or the speed of rotation of the motor, these are determined essentially in accordance with the flow of liquid to be treated and with the corresponding flow of treating gas to be introduced in the liquid.

With such a device, there results practically 100 percent efficiency for the conditions of operation indicated hereinbefore, and within practically any range of depth which might reach as much as 5 m and more and for gas flows which are also very variable and may be between about 20 and 700 m³ per hour.

Figure 3:
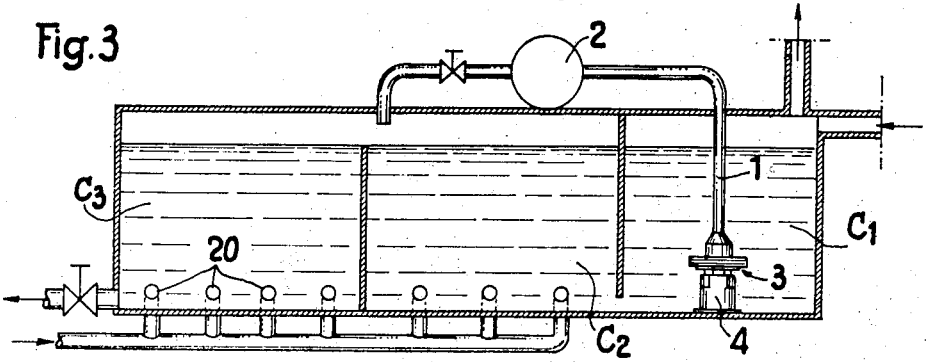

In the diagram shown in FIG. 3, a device according to the invention is employed in a pre-ozonizing tank $C_1$ of a waste waters-treating apparatus and the ozonized air which is supplied to the fan 2 is taken from the upper part of ozonizing tanks $C_2$, $C_3$ in which the ozone is introduced through porous tubes 20.

Figure 4:
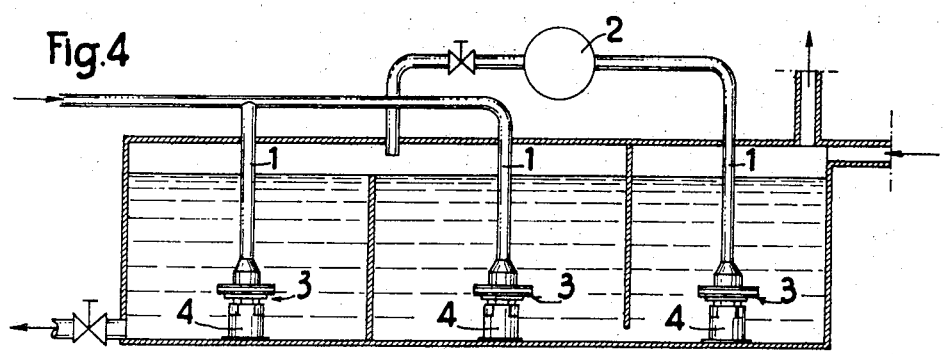

In the second example of application shown in the diagram in FIG. 4, such a device equips not only the preozonizing tank $C_1$ but also the ozonizing tanks $C_2$, $C_3$ in which the vertical tubes are supplied directly by the apparatus producing ozone, which supplies gas at a pressure which is such that is is unnecessary to provide an additional fan in the upper part of the supply tubes.

It must be understood that other types of apparatuses, with in particular a plurality of devices per tank, may be envisaged without departing from the scope of the invention.

Having now described my invention what I claim and desire to secure by Letters Patent is:

1. A device for treating a liquid and in particular for treating drinking water or waste waters, comprising in combination an upwardly extending tube for immersion in the liquid, means for supplying directly to the interior of the tube a treating gas under pressure, a centrifugal distributor for diffusing the gas in the liquid and combined coaxially with a lower part of the tube for immersion in the liquid, the distributor comprising upper radially extending wall means, lower radially extending wall means axially spaced from the upper wall means, a plurality of vanes extending outwardly of the distributor axis and defining with the upper wall means and lower wall means radially outwardly divergent chambers having radially inner ends and radially outer ends, the outer ends being open, treating gas inlet means connecting the interior of the tube to the inner ends of the chambers, means defining throughway orifices in the lower wall means in positions adjacent the inner ends of the chambers for putting the inner ends of the chambers in communication with a side of the lower wall means remote from the vanes, pump means having inlet means for the liquid and delivery outlet means for the liquid, which outlet means are axially adjacent said side of the lower wall means remote from the vanes and communicate with the orifices for pumping the liquid through the orifices into the chambers and producing in the chambers an emulsion of the liquid to be treated and the treating gas, and drive means for actuating the pump and driving the vanes in rotation so as to drive the emulsion outwardly through the open ends of the chambers.

2. A device as claimed in claim 1, wherein the flow of liquid delivered by the pump represents a given percentage of the flow of treating gas supplied by the supply means.

3. A device as claimed in claim 2, wherein said percentage is substantially 1 percent.

4. A device for treating a liquid and in particular for treating drinking water or waste waters, comprising in combination an upwardly extending tube for immersion in the liquid, means for supplying directly to the interior of the tube a treating gas under pressure, a centrifugal distributor for diffusing the gas in the liquid, the distributor comprising a fixed upper side wall and a fixed lower side wall spaced from the upper side wall, means defining an aperture in each of the side walls, the upper side wall being fixed along a portion of the upper side wall adjacent the periphery of its aperture to a lower open end portion of the tube, drive means having an output shaft extending axially through the apertures of the upper side wall and lower side wall, a disc located between and in spaced relation to the upper side wall and lower side wall, means drivingly connecting the shaft to the disc, a plurality of first vanes in fixed relation to a first face of the disc and extending outwardly of the shaft and defining with the upper wall and first face of the disc radially outwardly divergent chambers which have radially inner ends adjacent the aperture of the upper side wall and radially outer ends adjacent an outer peripheral edge of the upper wall and an outer peripheral edge of the disc, the chambers being open at the outer ends of the chambers, means defining throughway orifices in the disc in positions adjacent the periphery of the aperture of the upper side wall for putting the inner ends of the chambers in communication with a second face of the disc opposed to the first face of the disc, a pump comprising a body having an annular portion which is secured to the lower side wall adjacent the aperture of the lower side wall and defines liquid inlet means adjacent the shaft, and liquid outlet means adjacent the lower wall aperture, a plurality of second vanes adjacent said second face of the disc and extending outwardly of the shaft, the second vanes having radially inner ends adjacent the inlet means and radially outer ends adjacent the outlet means and adjacent the orifices, and means drivingly connecting the shaft to the second vanes whereby liquid drawn in by way of the inlet means is pumped by the second vanes through the orifices to the inner ends of the chambers.

5. A device as claimed in claim 4, comprising at least one orifice for each chamber.

6. A device as claimed in claim 4, wherein the orifices are upwardly and radially outwardly inclined.

7. A device as claimed in claim 4, wherein the number of first vanes is substantially higher than the number of second vanes.

8. A device as claimed in claim 7, wherein the ratio between the number of first vanes and second vanes is 4:1.

9. A device as claimed in claim 4, wherein the first vanes have outer ends on a diameter substantially greater than the diameter of outer ends of the second vanes, the diameter of the outer ends of the second vanes also being substantially greater than the diameter of the lower open end of the tube.

10. A device as claimed in claim 9, wherein the diameter of the outer ends of the second vanes is twice the diameter of the outer ends of the second vanes.

* * * * *